April 7, 1925.  
L. H. SHOVER  
ELECTRIC DEHYDRATOR  
Filed Oct. 20, 1924  
1,532,718
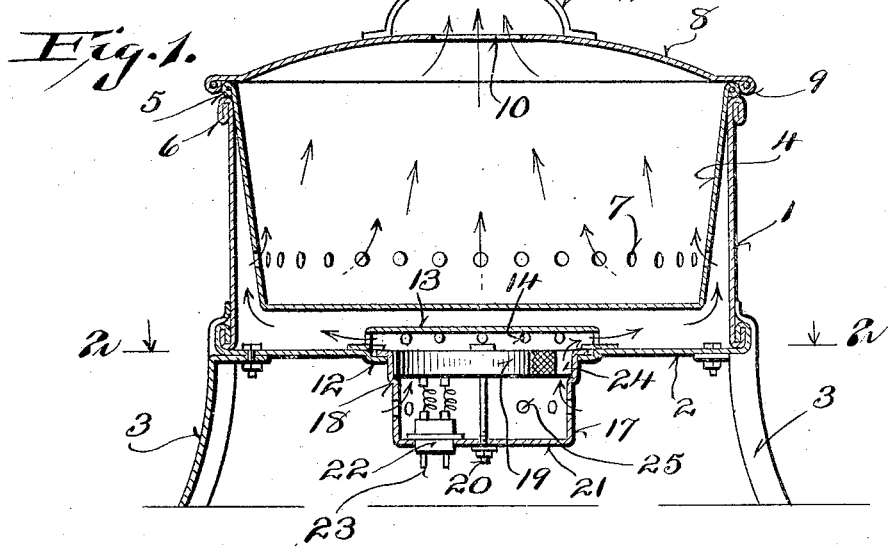
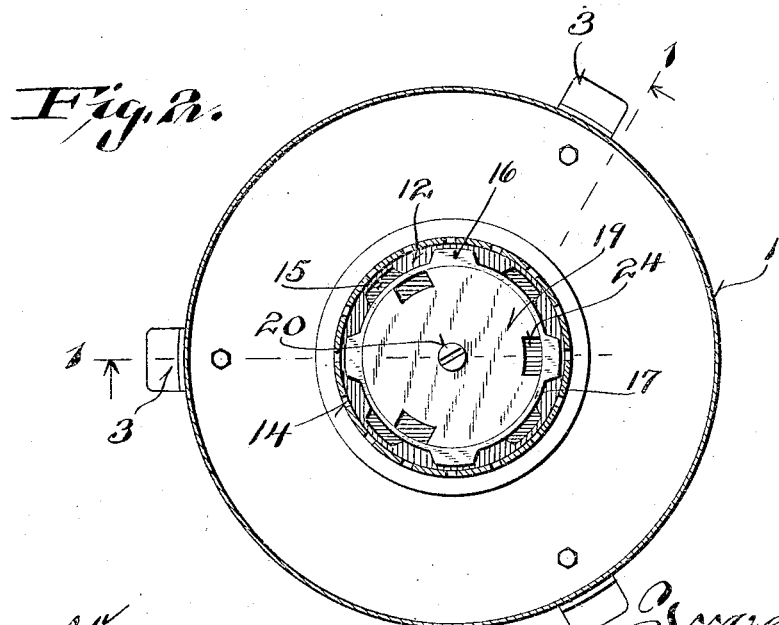
Inventor  
Lamar H. Shover Patented Apr. 7, 1925.

1,532,718

UNITED STATES PATENT OFFICE.

LAMAR H. SHOVER, OF MILWAUKEE, WISCONSIN.

ELECTRIC DEHYDRATOR.

Application filed October 20, 1924. Serial No. 744,841.

*To all whom it may concern:*

Be it known that I, LAMAR H. SHOVER, a citizen of the United States, and resident of Milwaukee, in the county of Milwaukee and State of Wisconsin, have invented certain new and useful Improvements in Electric Dehydrators and I do hereby declare that the following is a full, clear, and exact description thereof.

This invention relates to an electric dehydrator.

In certain types of devices such as candy jars, for instance hygroscopic disks are employed to take up the moisture in the normally closed jars and to thus prevent the candy from becoming sticky. These disks have to be dried at regular intervals so as to keep them in an effective state.

Merchants are not equipped for the drying of these disks and frequently attempt to dry them in make-shift devices such as ordinary hot plates and other similar heating means. This results in defective drying, in burning the disks and is wholly unsatisfactory. Further, due to the material trouble they have to go through to secure this drying they frequently put it off until the candy becomes sticky and unsaleable.

Further, the disks may not be in good condition when newly furnished, as they may have been kept for a material time before furnishing them to the merchant. It is, therefore, desirable that the new disks be thoroughly dried before they are used.

This invention is designed to supply the need manifest from the statements above, and objects of such invention are to provide an electric dehydrator for hygroscopic disks which is so constructed that a free flow of air is maintained to carry away the moisture from the heated disks, and which is so constructed that danger of burning the disks or overheating them is wholly avoided.

Further objects are to provide an electric dehydrator which may be economically employed, and which may be used without requiring the constant attendance of an operator, and which is so constructed that it may be maintained in a sanitary condition with the greatest ease.

An embodiment of the invention is shown in the accompanying drawings, in which:—

Figure 1 is a vertical sectional view through the dehydrator, such view corresponding to a section on the line 1—1 of Figure 2.

Figure 2 is a horizontal sectional view on the line 2—2 of Figure 1.

The dehydrator comprises a main chamber 1 preferably of cylindrical contour which is provided with a transverse circular base 2 and the entire device is carried by means of any suitable legs 3. This main chamber or vessel receives a movable container 4 which is preferably provided with a beaded edge 5 adapted to rest upon the correspondingly beaded, stiffened edge 6 of the main vessel 1. The container 4 is provided with a plurality of regularly spaced apertures 7 in its side walls adjacent its lower edge to permit free circulation of heated air. These apertures 7 are spaced a slight distance upwardly from the bottom of the container 4. The purpose of this upward spacing is to provide a basin like bottom for the container which is devoid of apertures and which will catch liquid which will drop from the disks in the early stage of heating and will prevent such liquid from traveling downwardly into contact with the heating element. A cover 8 is provided with a beaded edge 9 which fits over the edge 5 of the vessel 4, as shown in Figure 1.

This cover is provided with a central aperture 10 and a strap handle is positioned directly over and spans this aperture. This strap handle performs the desirable function of a guard over the aperture 10 to thus prevent the inadvertent closing of the aperture by the placing of a pan or other article thereover.

The base 2 is provided with a central aperture which is surrounded by a depressed shoulder 12 (see Figure 1). Above the aperture a guard plate 13 is positioned, as shown in Figure 1, and is rigidly secured to the base 2 and spaced therefrom. This guard plate is provided with a plurality of apertures 14 in its side walls to direct heated air laterally therefrom.

It is to be noted from Figure 2 that the flange or depressed portion 12 is provided with a series of notches 15 through which tongues 16 projecting laterally form a circular heater casing 17, may be passed. After the tongues have been passed through the apertures 15 the heater is rotated slightly to the position shown in Figure 2 so that the tongues 16 rest upon the flange 12 and thus retain the heater in position. This heater casing 17 is provided with a shouldered portion 18 and with a circular heating element 19 positioned within the casing and resting upon the shoulder. A central bolt 20 passes through the heating element and through the base 21 of the electric heater, being retained in position by means of a nut as shown, and thus permitting interchange or renewal of heating elements in a simple and easy manner.

A current controlled device 22 is carried within the base 21 of the heater and is connected with the heating element 19 and is provided with a pair of prongs 23 by means of which it may be readily connected with supply mains. It intermittently opens and closes the circuit and prevents continuous and unbroken flow of current.

It is to be noted from Figure 2 that the heating element 19 is provided with a plurality of apertures 24 spaced around its margin. One of these apertures is shown in Figure 1.

Further, it is to be noted that the casing 17 of the heater is provided with regularly spaced apertures 25 in its vertical cylindrical walls.

In operation, the hygroscopic disks are piled in a spaced manner within the container 4 and current is supplied the heater. The heated air rises and passes outwardly through the aperture 10. Fresh air is supplied through the apertures 25 in the heater casing and passes upwardly against the heater and through the apertures 24 therein. This heated air is then deflected by the guard plate 13 and passes through the apertures 14 in the cylindrical walls of such guard plate and is deflected laterally. The heated air then passes across the bottom of the container 4 and enters such container through the apertures 7 and comes directly into contact with the hygroscopic disks. There is, of course, a certain amount of radiation from the guard plate 13 to the container 4 but such guard plate prevents excessive heat from being applied to the container and therefore guards against burning of any portion of the charge of hygroscopic disks within the container 4 and aids in maintaining a uniform even temperature within such container of such a degree as will prevent burning of the disks while at the same time permitting a very free circulation of heated air to carry away the moisture laden air within the container.

It is to be noted that the automatic circuit making and braking device 22 permits the heater to operate at any desired temperature for it is obvious that the adjustment of the circuit maker and braker may be such as to give the exact relation between the duration of the heating period to the open circuit period in a well known manner.

It will thus be seen that an electric dehydrator has been provided which can be economically used by small dealers although, if desired, it may obviously be made in large sizes, and which will operate in an effective manner to adequately and rapidly dry hygroscopic disks without any danger whatsoever of burning them.

It will further be seen that the device may be kept in a sanitary condition and may be readily washed when desired as the heater may be bodily detached from the remaining portions of the apparatus and therefore such apparatus may be scalded or washed as needed.

Although the invention has been described in considerable detail, it is to be understood that the invention may be variously embodied and is, therefore, to be limited only as claimed.

I claim:

1. A dehydrator for hygroscopic disks comprising a main vessel having a transverse bottom plate, a heater removably carried by said bottom plate, and adapted to supply a current of heated air to said vessel, a container removably seated within said vessel and spaced from the bottom thereof, said container having a plurality of regularly spaced apertures adjacent its lower portion, and a cover for said container provided with an outlet aperture therein.

2. A dehydrator for hygroscopic disks comprising a main vessel having a transverse bottom plate, a heater removably carried by said bottom plate and adapted to supply a current of heated air to said vessel, a container removably seated within said vessel and spaced from the bottom thereof, said container having a plurality of regularly spaced apertures adjacent its lower portion, and a cover for said container provided with an outlet aperture therein, said cover having a strap like handle positioned transversely of said outlet aperture and acting as a guard for such aperture.

3. An electric dehydrator comprising a main vessel having vertical walls and a transverse centrally apertured bottom, said bottom having a circular flange surrounding said aperture, an electric heater having portions cooperating with said flange to detachably retain said heater in position and having apertures therethrough to permit free flow of heated air into said vessel, a guard plate positioned above said heater and spaced from the bottom of said vessel, a container removably carried by said vessel and having a plurality of apertures through its side walls adjacent the bottom thereof, and an apertured cover for said container.

4. An electric dehydrator for hygroscopic disks comprising a main vessel having vertical side walls and a centrally apertured transverse bottom, said bottom having a notched circular flange surrounding said aperture and having a guard plate spaced above said aperture, an electric heater comprising a casing having outwardly projecting lugs adapted to be passed through the notches in said flange and to be seated upon such flange, a heating element removably carried within said casing, said casing and heating element having apertures therethrough for the free passage of air upwardly into said vessel, a container for the hygroscopic disks removably positioned within the vessel and carried from the vertical walls thereof, said container having a plurality of regularly spaced apertures in its side walls adjacent the bottom thereof, and an apertured cover for said container.

In testimony that I claim the foregoing I have hereunto set my hand at Milwaukee, in the county of Milwaukee and State of Wisconsin.

LAMAR H. SHOVER.